May 14, 1940.  K. R. HERMAN  2,200,824
POWER TRANSMISSION
Filed Dec. 16, 1937

INVENTOR
KENNETH R. HERMAN
BY
Ralph L. Tweedale
ATTORNEY

Patented May 14, 1940

2,200,824

UNITED STATES PATENT OFFICE 2,200,824

POWER TRANSMISSION

Kenneth R. Herman, Huntington Woods, Mich., assignor to Vickers Incorporated, Detroit, Mich., a corporation of Michigan Application December 16, 1937, Serial No. 180,073

7 Claims. (Cl. 137—153)

This invention relates to power transmissions and more particularly to those of the kind wherein a power transmitting fluid such as oil and, hereinafter referred to as such, is utilized for transmitting power between a pump and a fluid motor. The invention is particularly concerned with a valve for use in a power transmission system of this type although it will be understood that many of the advantages provided thereby may be beneficially utilized for other purposes than fluid power transmission systems.

An object of the present invention is to provide a multiple valve comprised of plurality of body parts which may be assembled together in different relationships to provide different valve characteristics as may be required in various installations.

A further object is to provide a valve which is simple and economical to manufacture and reliable in operation throughout a long useful life.

Further objects and advantages of the present invention will be apparent from the following description, reference being had to the accompanying drawing wherein a preferred form of the present invention is clearly shown.

Figure 1:
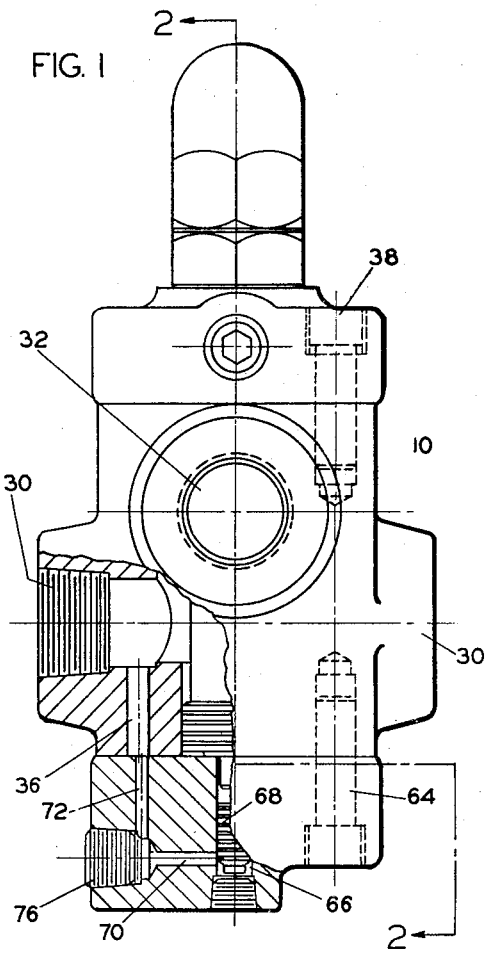
Figure 1 is a side view, partly in section of a valve embodying a preferred form of the present invention.

The valve illustrated in the drawing comprises a main body member 10, having a central longitudinal bore 12 extending through to the opposite end faces 14 and 16 of the body member 10. The bore 12 is provided with enlarged portions 18 and 20 forming a pair of ports, communication between which may be opened or closed by a reciprocable valve spool 22. The valve spool 22 has a pair of piston heads 24 and 26 which are freely slidable with a substantially fluid tight fit in bore 12 and is also provided with a projection 28 on its lower end. The port 20 is provided with a pair of inlet connections 30, one or both of which may be connected with an oil conduit for supplying oil to the valve. Port 18 is provided with an outlet connection 32 for connection to a conduit to which the supply of oil is controlled by valve spool 22. The body 10 includes a pair of auxiliary passages 34 and 36 extending from the ports 32 and 30 respectively to the end faces 14 and 16 respectively.

Secured to the end 14 by bolts 38 is an end cap 40 within which is threaded an adjusting screw 42. A spring 44 is mounted in a recess 46 of the screw 42 and a recess 48 formed in the valve spool 22. A chamber 50 in the end cap 40 is in communication with the end of the bore 12, for delivering and exhausting oil from the bore 12 as the spool 22 moves therein. A bore 52 extends through the lower end of the spool 22 for connecting the spaces at opposite ends of spool 22. Leading from the chamber 50 is a passage 54 having an auxiliary branch passage 56 which opens to the end face 14 of the body 10. The end cap 40 also carries a suitable lock nut 58 and closure cap 60, both secured on the screw 42.

Mounted on the end face 16 of the body 10 is a second end cap member 62 which is secured thereto by bolts 64. The end cap 62 is provided with a cylinder or chamber 66 in which an auxiliary piston 68 is reciprocably mounted for lifting the valve spool 22 by a fluid pressure exerted on the bottom of the piston 68 in opposition to the force of spring 44. The chamber 66 connects with a passage 70, having an auxiliary branch passage 72 extending to the end face 16 of body 10. The passages 54 and 70 are provided with external conduit connections at 74 which, as shown in Figures 1 and 2, are plugged.

The end caps 40 and 62 are adapted to be secured to the body 10 in any of several angularly spaced positions. In the example illustrated in the drawing there are four such positions. In the position shown in Figures 1, 2 and 3, the end cap 40 is so mounted that the auxiliary passage 56 is in registration with the auxiliary passage 34 in the body 10, while the auxiliary passage 72 is likewise in registration with the auxiliary passage 36 in the body 10. When either end cap is removed and reassembled in any one of the three other possible positions, the corresponding auxiliary passages, both in the end cap and in the body member are blocked. Under these conditions either or both of the plugs at 74 and 76 may be removed providing an external connection to the chambers 50 and 66 respectively.

Figures 4, 5, 6:
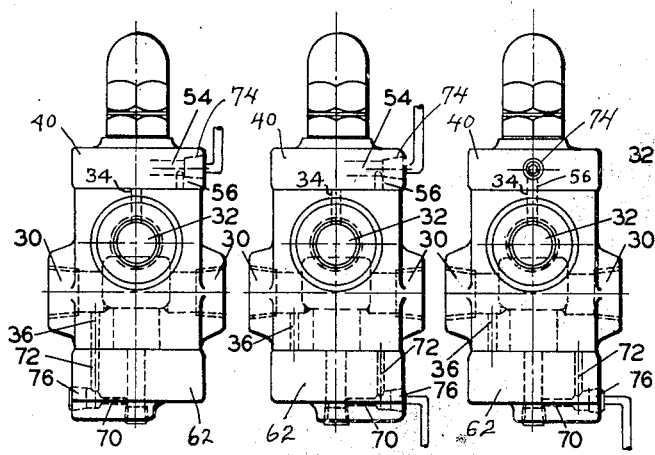
Figures 4, 5 and 6 are views corresponding to Figure 1 showing the parts assembled in different positions.

Three other possible assembling combinations are illustrated in Figures 4, 5 and 6. In Figure 4 the end cap 40 has been turned to 90° from the position of Figure 1 while the end cap 62 remains as shown in Figure 1. In this position the chamber 50 is not connected to the port 32 and the plug at 74 is removed to provide an external drain connection to the chamber 50. The valve actuating chamber 66 is connected to port 20 and the plug at 76 remains in position. In the position shown in Figure 5 the end cap 40 is the same as in Figure 4 while the end cap 62 has been turned 180° to block both the auxiliary passages 36 and 72. In this position the plug at 76 may be removed to provide an external connection for pressure fluid for operating the piston 68 to open the valve. In Figure 6 the end cap 62 is the same as in Figure 5 while the end cap 40 is the same as in Figure 1. Under these conditions the chamber 50 is drained to the port 18 while the valve actuating chamber 66 remains connected for external operation.

Figure 2:
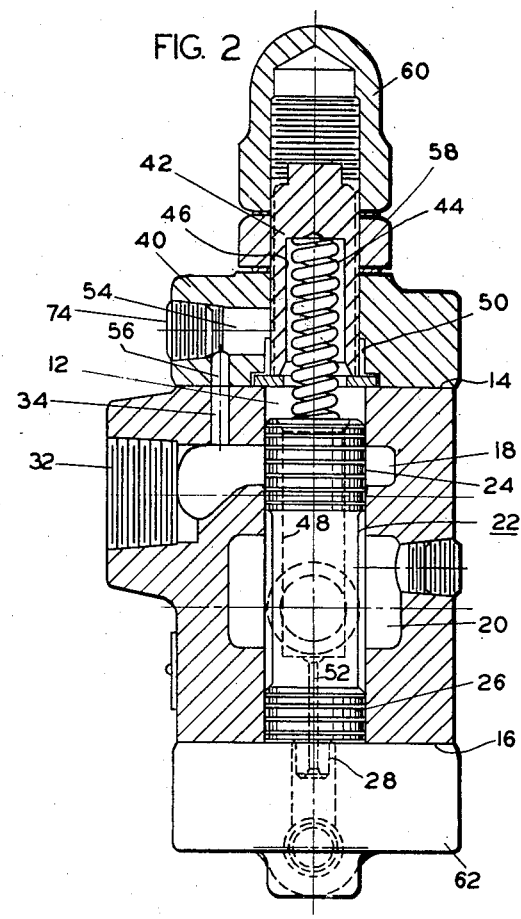
Figure 2 is a cross-sectional view on line 2—2 of Figure 1.

When the valve is assembled, either as shown in Figure 1 or 4, it will be seen that the pressure existing in the port 20 and the setting of the spring 44 will determine the point at which the valve spool 22 is raised to open communication from port 20 to 18. Thus, so long as the pressure in port 20 is below the value at which its force exerted over the area of the piston 68 is equal to the downward force of the spring 44, the spool 22 remains in the same position shown. Whenever this pressure is exceeded in port 20, piston 68 moves upwards overcoming the force of spring 44 and opening the valve to permit discharge of oil from the port 20 to the port 18.

Figure 3:
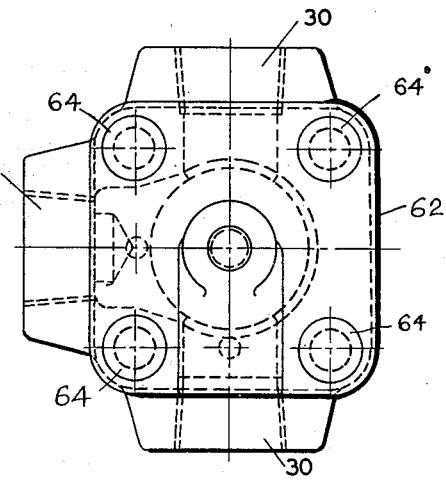
Figure 3 is a bottom view of the valve.

In operation of the valve with the parts assembled as in Figures 1 thru 3, the same may be utilized as a conventional pressure relief valve for by-passing oil from the high pressure conduit connection 30 to a lower pressure or tank conduit connection 32. Whenever pressure in the high pressure conduit and port 20 rises above the value for which the spring 44 is set, valve spool 22 rises, permitting whatever oil to pass to the port 18 that may be required to cause the pressure in port 20 to again fall below the setting of the spring 44. When the valve is used for this purpose, since the port 18 is normally connected to a low pressure or tank conduit, the drain chamber 50 is drained to the port 18, thus avoiding the necessity of external piping to permit "breathing" of oil to and from the end chambers of the valve bore 12.

When the parts are assembled in the position shown in Figure 4, the valve may be used as a sequence valve to hold oil in the port 20 until a predetermined pressure is built up and then by-passing oil to port 18 thereafter. Such a valve is useful where it is desired to operate a pair of fluid motors in sequence, the first motor being supplied with oil from the port 20 and the second motor being supplied with oil from the port 18. The spring 44 will be set so that the valve stays closed at the normal operating pressure of the first motor and only opens when the latter becomes stalled at the end of its stroke. Thereafter oil will by-pass through port 18 for operating the second motor. Since the port 18 is, under these conditions, not connected to a low pressure tank line, it is necessary to provide an external drain at 74 to the chamber 50.

With the parts assembled in the position shown in Figures 5 and 6 the valve may be utilized as a pilot operated remote control valve which opens to connect ports 18 and 20, whenever fluid pressure is admitted to the chamber 66 through the external connection made at 76. If the port 18 is not connected to the low pressure side an external drain may be provided at 74 with the ports assembled as shown in Figure 5. If port 18 is connected to the low pressure side the chamber 50 may be drained internally as shown in Figure 6.

While the form of embodiment of the invention as herein disclosed constitutes a preferred form, it is to be understood that other forms might be adopted, all coming within the scope of the claims which follow.

What is claimed is as follows:

1. A valve for controlling fluid flow comprising a main body member having a central longitudinal bore, lateral ports communicating with said bore at axially spaced points therein, a valve spool slidable in the bore to control connections between said ports, an auxiliary passage communicating with one of said ports and extending to an end of said body, an end cap member adapted to be fixedly attached to said end of the body member in at least two different positions, means forming a fluid chamber in said end member, an auxiliary passage in said end member extending to the end of the body member and communicating with the chamber, said auxiliary passages being positioned for registration in one position of the end member and for non-registration in another position of the end member and means in one of said members affording external connection to the auxiliary passage in the end member independently of said one port when the passages are in non-registration.

2. A valve for controlling fluid flow comprising a main body member having a central longitudinal bore, lateral ports communicating with said bore at axially spaced points therein, a valve spool slidable in the bore to control connections between said ports, an end cap member adapted to be fixedly attached to the body member in at least two different positions, means forming a fluid chamber in said end member, and means for connecting said chamber to one of said ports when the end member is in one position and for blocking communication therebetween when the end member is in another position, and means providing an external connection to said chamber independently of said one port when the end member is in said other position.

3. A valve for controlling fluid flow comprising a main body member having a central longitudinal bore, lateral ports communicating with said bore at axially spaced points therein, an end cap member adapted to be mounted on the body member in at least two different positions, a second end cap member also adapted to be mounted on the body member in at least two different positions, means forming a fluid chamber in each of said end members, means for connecting one of said chambers to one of said ports when the corresponding end member is in one position and for blocking communication therebetween when the end member is in another position, means for connecting the other chamber to the other port when the corresponding end member is in one position and for blocking communication therebetween when the end member is in the other position, and means providing external connection to each of said chambers independently of said ports when the corresponding end member is in said other position.

4. A valve for controlling fluid flow comprising a body member having a central longitudinal bore, lateral ports communicating with said bore at axially spaced points therein, a movable valve member in said bore for controlling communication between said ports, an end cap member adapted to be mounted on the body member in at least two different positions, a second end cap member also adapted to be mounted on the body member in at least two different positions, means forming a fluid chamber in each of said end members, one of said chambers receiving and delivering fluid when said valve member is moved, a piston for operating said valve member and in communication with the other chamber, means for connecting one of said chambers to one of said ports when the corresponding end member is in one position and for blocking communication therebetween when the end member is in another position, means for connecting the other chamber to the other port when the corresponding end member is in one position and for blocking communication therebetween when the end member is in the other position, and means providing external connection to each of said chambers independently of said ports when the corresponding end member is in said other position.

5. A valve for controlling fluid flow comprising a main body member having a central longitudinal bore, lateral ports communicating with said bore at axially spaced points therein, a valve spool slidable in the bore to control connections between said ports, an end member adapted to close the end of the bore and to define therewith an end chamber in which idle fluid is displaced during shifting of the valve member, means forming a passageway in the body member and in the end member to connect the end chamber with one of the ports, said passageway having a branch portion forming an external connection, and means for attaching the end member to the body selectively in a plurality of positions whereby the end chamber may be arranged for draining either to said one port or to an external drain line.

6. A valve for controlling fluid flow comprising a main body member having a central longitudinal bore, lateral ports communicating with said bore at axially spaced points therein, a valve spool slidable in the bore to control connections between said ports, an end member adapted to close the end of the bore and to define therewith an end chamber for admission of pressure fluid to shift the valve member, means forming a passageway in the body member and in the end member to connect the end chamber with one of the ports, said passageway having a branch portion forming an external connection, and means for attaching the end member to the body selectively in a plurality of positions whereby the end chamber may be connected for shifting of the valve member either by fluid from said one port or by fluid from an external line.

7. A valve for controlling fluid flow comprising a main body member having a central longitudinal bore, lateral ports communicating with said bore at axially spaced points therein, a valve spool slidable in the bore to control connections between said ports, a pair of end members, one adapted to close each end of the bore and to define therewith one end chamber in which idle fluid is displaced during shifting of the valve member and a second end chamber for admission of pressure fluid to shift the valve member, means forming a plurality of passageways in the body member and in the end members to connect each end chamber with a separate one of said ports, said passageways having a branch portion forming external connections, and means for attaching each end member to the body in a plurality of positions whereby each end chamber may be selectively connected either with one of said ports or with an external line.

KENNETH R. HERMAN.